United States Patent [19]

Alten

[11] Patent Number: 4,986,405
[45] Date of Patent: Jan. 22, 1991

[54] INCLINED RAMP

[76] Inventor: Kurt Alten, Ringstr. 14, D-3015 Wennigsen, Fed. Rep. of Germany

[21] Appl. No.: 473,229

[22] Filed: Jan. 31, 1990

[30] Foreign Application Priority Data

Feb. 3, 1989 [DE] Fed. Rep. of Germany ....... 3903177

[51] Int. Cl.$^5$ .............................................. B65G 11/00
[52] U.S. Cl. ........................................ 193/38; 193/41; 14/69.5; 14/72.5
[58] Field of Search ............................ 193/3, 38, 41, 4; 414/376, 401; 14/69.5, 71.1, 72.5; 105/215.2

[56] References Cited

U.S. PATENT DOCUMENTS

| | | | |
|---|---|---|---|
| 648,620 | 5/1900 | Holmes | 14/72.5 X |
| 753,833 | 3/1904 | Copley | 183/38 X |
| 1,221,156 | 4/1917 | Dotson | 14/71.1 X |
| 3,088,568 | 5/1963 | Troy | 193/38 |
| 3,580,373 | 5/1971 | Stickle | 193/38 X |
| 3,943,589 | 3/1976 | Pedersen | 14/69.5 |
| 4,878,800 | 11/1989 | Dell | 414/401 |

FOREIGN PATENT DOCUMENTS

| | | | |
|---|---|---|---|
| 3042766 | 6/1982 | Fed. Rep. of Germany | 14/72.5 |
| 1381406 | 1/1975 | United Kingdom | 14/72.5 |
| 2062580 | 5/1981 | United Kingdom | 193/38 |

Primary Examiner—H. Grant Skaggs
Assistant Examiner—James R. Bidwell
Attorney, Agent, or Firm—Robert W. Becker & Associates

[57] ABSTRACT

A mobile inclined ramp having longitudinal members that are disposed at the sides and are connected by transverse members that have a U-shaped cross-sectional configuraiton, with the cross parts of the transverse members being directed downwardly. To increase the load-carrying capacity of the tranverse members and to increase the traction of the travel surface of the ramp, plates are disposed between the cross parts of the transverse members. At the top, these plates end approximately at the level of anti-slip or traction elements of flanges of the transverse members. The plates are securely clamped between adjacent transverse members by bolt connections.

8 Claims, 1 Drawing Sheet

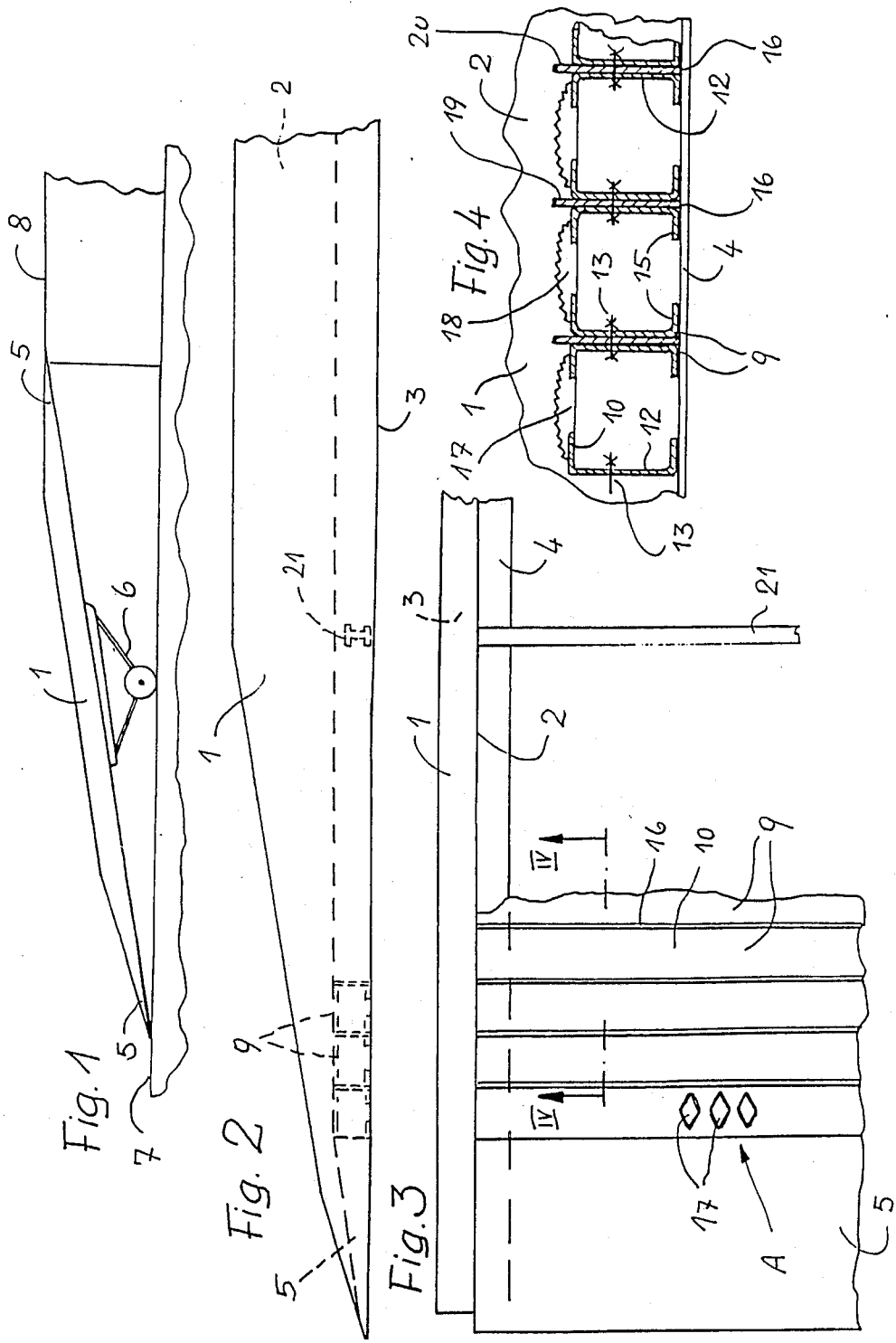

INCLINED RAMP

BACKGROUND OF THE INVENTION

The present invention relates to an inclined ramp that can be moved from place to place, especially a mobile ramp, and that serves for the loading and unloading of platforms or the like that are disposed at a level higher than the roadway, the ramp having two longitudinal members that are disposed at both sides of the ramp, with the longitudinal members being connected to one another via transverse members that are distributed over the length of the ramp and have an essentially U-shaped cross-sectional configuration, with the transverse members forming at least the greatest portion of a travel surface for the ramp.

In one heretofore known ramp of this type, cross parts of the transverse members form the travel surface and interconnect two legs that extend approximately perpendicular to this travel surface, with legs of adjacent transverse members being bolted together. It is furthermore known to provide openings in the cross parts of the transverse members that form the travel surface, with the edges of these openings being bent upwardly to provide traction on the travel surface of the ramp. However, these measures are inadequate where the inclination of the ramp is to be increased, for example up to 45°.

It is therefore an object of the present invention to improve inclined ramps of the aforementioned general type so that their angle of inclination can be increased, with the inventive measures that bring this about also contributing to an increase of the load-carrying capacity of the transverse members.

BRIEF DESCRIPTION OF THE DRAWING

This object, and other objects and advantages of the present invention, will appear more clearly from the following specification in conjunction with the accompanying schematic drawing, in which:

FIG. 1 is a side view showing one exemplary embodiment of the inventive inclined ramp;

FIG. 2 is an enlarged side view showing the lower portion of the ramp of FIG. 1;

FIG. 3 is a partial plan view of the ramp portion of FIG. 2; and

FIG. 4 is a cross-sectional view taken along the line IV—IV in FIG. 3.

SUMMARY OF THE INVENTION

The inclined ramp of the present invention is characterized primarily in that: each transverse member has a cross part that extends essentially perpendicular to the travel surface and connects two flanges, an upper one of which forms the travel surface and is provided with means to prevent slipping; and a respective plate of metal or some other material of similar strength is disposed between each two adjacent cross parts of successive transverse members, with the two adjacent cross parts and the plate that is disposed therebetween being interconnected via bolt means. The plates extend upwardly essentially to the level of the projection or traction means that are disposed on the flanges. These plates, which are secured by the bolts that are provided anyway for securing the transverse members together, reinforce the cross parts of the transverse members and in turn also serve as transverse members. Furthermore, the free ends of the plates that terminate upwardly form projections that considerably increase the traction of the travel surface. The inventive plates expediently extend over the entire height of the cross parts of the transverse members, so that a good reciprocal contact can also be provided between the plates and the cross parts of the transverse members. The plates should also extend over the entire length of the transverse members, i.e. essentially from one longitudinal member to the other.

Further specific features of the present invention will be described in detail subsequently.

DESCRIPTION OF PREFERRED EMBODIMENTS

Referring now to the drawing in detail, disposed along each edge of the inventive ramp is a longitudinal member 1, which has a box-type configuration. The inner side wall of the longitudinal member 1 is designated by the reference numeral 2. The base 3 is widened toward the inside; this widened portion 4 has a length that corresponds approximately to the width of the base 3.

Disposed at each end of the ramp is a hollow end section 5. Disposed below the ramp is a truck or undercarriage 6 that could be designed to be retracted and extended, and that serves for transporting the ramp.

As shown in FIG. 1, the inventive ramp forms a travel surface between a street surface or the like 7 and a platform or dock 8 that is disposed at a higher level and on the edge of which the upper end section 5 rests.

Between the two end sections 5, the two longitudinal members 1 are connected by transverse members 9 that are bent from sheet steel and have an approximately U-shaped cross-sectional configuration. The upper flange 10 of the transverse member 9 forms the travel surface of the ramp; the parts 12 of the transverse members 9 are directed downwardly and can be provided with inwardly bent portions 15.

The ends of the transverse members 9 rest upon the widened portion 4 and abut flushly against the side wall 2. Bolted connections can be provided at that location in order to connect the transverse members 9 to the longitudinal members 1. In this region the bent portions 15 also rest upon the widened portion 4.

The cross members or parts 12 of adjacent transverse members 9 do not rest directly against one another; instead, plates 16 that extend over the length of the transverse members are disposed between the cross parts 12 thereof. The height of these plates 16 is slightly greater than that of the cross parts 12, in which connection the plates 16 project upwardly beyond the parts 12, whereas at the bottom, however, the plates 16 are flush with the parts 12. The securement of the cross parts 12 to one another and with the plates 16 is effected by screws or bolts 13, each of which extends through two parts 12 and a plate 16 that is disposed therebetween. As a result, these components are pressed securely together, thereby forming a single support means that rests on its edge.

The flanges 10 are provided with a plurality of openings 17; the edges of these openings are angled upwardly by deformation of the flanges 10, with the outer parts of the edges being serrated. These serrated edges, which are designated by the reference numeral 18, increase the reliability against slipping and form raised portions relative to the flanges 10. To further improve the reliability against slipping, the upper edges 19 of the plates 16 are also serrated: the portions of the plates 16 that project beyond the planar portions of the flanges 10 are designated with the reference numeral 20.

Pursuant to the inventive construction, the plates 16 serve to increase the load-carrying capacity of the transverse members 9, especially since the ends thereof also rest upon the widened portions 4. In addition, the projecting portions 20 of the plates 16 serve to increase the traction of the travel surface; this is effected in particular since the plates 16 extend transverse to the longitudinal direction of the ramp.

To facilitate illustration, in FIG. 3, at the arrow A, only three openings 17 are illustrated. However, it is to be understood that all of the flanges 10 are provided with a plurality of such openings 17.

Within the transverse members 9, weak, spaced-apart transverse connectors 21 can be provided. With regard to strength, these members have little or no significance, and serve predominantly to improve assembly; in addition, these members 21 are not disposed in the travel surface.

The present invention is, of course, in no way restricted to the specific disclosure of the specification and drawing, but also encompasses any modifications within the scope of the appended claims.

What I claim is:

1. In an inclined ramp that can be moved from place to place, especially a mobile ramp, and that serves for the loading and unloading of platforms or the like that are disposed at a level higher than the roadway, said ramp having two longitudinal members that are disposed at both sides of the ramp, with said longitudinal members being connected to one another via transverse members that are distributed over the length of said ramp and have an essentially U-shaped cross-sectional configuration, with said transverse members forming at least the greatest portion of a travel surface for said ramp, the improvement wherein:

each of said transverse members has a cross part that extends essentially perpendicular to said travel surface and connects two flanges, an upper one of which forms said travel surface and is provided with means to prevent slipping; and a respective plate is disposed between each two adjacent cross parts of successive transverse members, with said two adjacent cross parts and said plate that is disposed therebetween being interconnected via bolt means, and with said plate projecting upwardly beyond said upper flange into the vicinity of said means thereof to prevent slipping.

2. An inclined ramp according to claim 1, in which an upper end of said plates is flush with said means of said flange to prevent slipping.

3. An inclined ramp according to claim 1, in which a lower end of said plates is flush with said transverse members.

4. An inclined ramp according to claim 1 in which said longitudinal members are provided with projecting means for supporting said transverse members, with ends of said plates also resting upon said projecting means.

5. An inclined ramp according to claim 1, in which said upwardly projecting edges of said plates are provided with means to prevent slipping.

6. An inclined ramp according to claim 5, in which said means of said plates to prevent slipping comprises a serration.

7. An inclined ramp according to claim 2, in which an entire effective length of said plates projects beyond said upper flanges of said transverse members, and in which said means of said upper flanges to prevent slipping are spaced from one another and are distributed over the length of said transverse members.

8. An inclined ramp according to claim 1, in which said plates are securely clamped between said cross parts of said transverse members.

* * * * *